United States Patent [19]
Brown

[11] Patent Number: 5,618,156
[45] Date of Patent: Apr. 8, 1997

[54] MATERIAL HANDLING MACHINE

[75] Inventor: David J. B. Brown, North Yorkshire, United Kingdom

[73] Assignee: Caterpillar Inc., Peoria, Ill.

[21] Appl. No.: 537,070

[22] Filed: Sep. 29, 1995

Related U.S. Application Data

[63] Continuation of Ser. No. 85,012, Jun. 29, 1993, abandoned.

[30] Foreign Application Priority Data

Jun. 30, 1992 [GB] United Kingdom ............... 9213894

[51] Int. Cl.⁶ ........................................ E02F 3/28
[52] U.S. Cl. ........................ 414/694; 180/237; 180/292; 414/680
[58] Field of Search ........................ 414/694, 685, 414/686, 718, 728; 180/84.13, 326, 327, 329, 330, 331, 291, 248, 233, 234, 237, 292; 280/787, 754, 690

[56] References Cited

U.S. PATENT DOCUMENTS

| Re. 30,021 | 5/1979 | Olson et al. . | |
|---|---|---|---|
| 1,066,072 | 7/1913 | Bouas | 180/237 |
| 1,246,116 | 11/1917 | Kroeter | 180/237 |
| 1,331,197 | 2/1920 | Hazlett | 180/237 |
| 2,257,772 | 10/1941 | Wolf | 180/292 X |
| 3,883,153 | 5/1975 | Singh et al. | 280/754 X |
| 3,967,744 | 6/1976 | Goyarts . | |
| 4,087,009 | 5/1978 | Profenna et al. | 414/686 |
| 4,135,597 | 1/1979 | Barth | 180/139 |
| 4,152,004 | 5/1979 | Schroder | 280/111 |
| 4,805,720 | 2/1989 | Clenet | 180/248 |
| 4,869,337 | 9/1989 | Wagner | 180/330 |
| 4,989,685 | 2/1991 | Matsuda | 180/233 X |
| 5,000,269 | 3/1991 | Aoki et al. | 414/686 X |

FOREIGN PATENT DOCUMENTS

| 0005908 | 12/1979 | European Pat. Off. . | |
|---|---|---|---|
| 2217272A | 10/1989 | European Pat. Off. . | |
| 0433244A1 | 11/1990 | European Pat. Off. . | |
| 2530605 | 1/1984 | France | 180/326 |
| 2739537 | 9/1978 | Germany . | |
| 517282 | 1/1940 | United Kingdom . | |
| 727917 | 4/1955 | United Kingdom . | |
| 763437 | 12/1956 | United Kingdom . | |
| 1575131 | 9/1980 | United Kingdom . | |
| 2081656 | 2/1982 | United Kingdom . | |
| 2137145 | 3/1983 | United Kingdom | 414/687 |
| 2161784 | 1/1986 | United Kingdom . | |
| 2250246 | 3/1992 | United Kingdom . | |
| 8900972 | 9/1989 | WIPO . | |

Primary Examiner—Donald W. Underwood
Attorney, Agent, or Firm—Diana L. Charlton

[57] ABSTRACT

The material handling machine has a chassis comprising a rigid longitudinal frame whose width is less than 25% of the overall width of the machine, excluding the wheels. A boom or a loading bucket is pivotally mounted on the chassis. Digging equipment is mounted at the rear of the chassis. A drive arrangement comprises a mechanically driven transmission kinematically connected to an engine. Shafts kinematically connect a power output mid-way along the drive arrangement to final drive units on the front and rear axles. The drive arrangement is mounted at one side of the longitudinal frame between the axles, and an operator's cab is mounted at the other side or above the longitudinal frame. The cab is movable between a forward position and a raised rear position.

1 Claim, 15 Drawing Sheets

Fig_6_

Fig-8-

Fig_12_

MATERIAL HANDLING MACHINE

This is a file wrapper continuation of application Ser. No. 08/085,012, filed Jun. 29, 1993, now abandoned.

BACKGROUND OF THE INVENTION

1. Field of the Invention

This invention relates to machines for handling materials, in particular machines which can be used for loading or digging.

2. Description of the Prior Art

Material handling machines for use on construction sites usually have crawler tracks or large-diameter wheels and are usually designed to carry out a given task such as digging, loading, or pallet-lifting. If a machine is designed to carry out two tasks, one of these will be the primary task, and the secondary task will be carried out less efficiently because of physical design constraints.

In material handling machines in which both the front and rear wheels are driven, an engine mounted at an arbitrary position on the chassis usually drives a hydraulic pump which supplies a hydraulic circuit feeding hydraulic motors associated with the wheels. Such a hydraulic transmission is very inefficient compared with a mechanical transmission.

One known machine which is in use has a rear-mounted backhoe, a front-mounted engine, and a front-mounted linkage carrying a loader bucket. This has the disadvantages of poor loader visibility (the operator's line of sight is obstructed by the hood of the engine) and poor maneuverability (the linkage obstructs the turning of the front wheels). A similar known machine improves maneuverability by using smaller front wheels, but this compromises stability and load capacity.

Another known machine has a rear-mounted engine and a front-mounted linkage carrying a loader bucker, pallet forks, or a telescopic arm. Forward visibility is good, but a backhoe has to be omitted because of the rear-mounted engine.

Another known machine also has a rear-mounted engine. A telescopic boom extends forwards from a rear pivotal mounting, along the center-line of the machine, the operator's cab being mounted at one side. The extremity of the boom carries a loader bucket or pallet forks. Again, forward visibility is good but a backhoe cannot be fitted at the rear.

SUMMARY OF THE INVENTION

It would therefore be desirable to be able to provide a material handline machine which could carry out lifting, loading, and digging operation. The main problem to be overcome is to locate the essential components (engine, transmission, cab, and loader linkage or boom) in the optimum position, from the mechanical and functional point of view, whilst maintaining good visibility for all functions, stability, maneuverability, structural integrity, and ease of servicing.

The present invention provides a material handling machine having a chassis comprising a rigid longitudinal frame, a front axle and a rear axle mounted on the chassis, wheels mounted on the axles, a drive arrangement comprising an engine and a mechanically driven transmission kinematically connected to the engine, and shafts kinematically connecting a power output of the drive arrangement to final drive units on the respective front and rear axles, for driving the wheels, the drive arrangement being mounted at one side of the longitudinal frame.

In one aspect the invention provides a material handling machine comprising: (a) a chassis comprising a rigid longitudinal frame; b) an operator's cab mounted on the chassis; (c) material handling means pivotally mounted on the chassis; (d) a front axle and a rear axle mounted on the chassis; (e) wheels mounted on the axles; (f) a drive arrangement mounted on the chassis, at one side of the longitudinal frame between the front and rear axles, the drive arrangement comprising an engine and a mechanically driven transmission kinematically connected to the engine and having a power output substantially mid-way along the drive arrangement; (g) final drive units on the respective front and rear axles for driving the wheels; and (h) shafts kinematically connecting the power output to the final drive units.

it is possible to provide good forward and rearward visibility from the cab. The side-mounted engine and transmission can be made readily accessible for servicing. The drive arrangement can be mounted on a transverse chassis frame mounted on the longitudinal frame without compromising the structural integrity of the longitudinal frame. It is possible to provide good maneuverability of the wheels unrestricted by the drive arrangement. The front and rear wheels can be of substantially equal size, giving good stability and load capacity. Stability is also enhanced by a long wheel-base. Adequate height and reach for a wide range of lifting and loading operations can be provided by a boom, which may have one, two, three, or more sections.

In a second aspect the invention provides a material handling machine having a chassis for mounting means for carrying out operations in front of and to the rear of the machine and an operator's cab mounted on the chassis, the cab being mounted for movement between a first position in which the region in front of the machine is more easily visible to the operator and a second position in which the region to the rear of the machine is more easily visible.

Preferably the first and second positions are forward and rearward positions. One of the positions is preferably higher than the other. One of the positions may conveniently be substantially mid-way along the chassis.

Whilst it may be possible to arrange for the cab to pivot about a vertical axis during movement between the first and second positions, this may require extra width-wise space and it is preferable for the movement to be one of translation only. Preferably the cab contains first controls for operations in front of the machine and second controls for operations to the rear of the machine, the first and second controls being respectively at the front and rear of the cab in both of its said positions. Preferably the cab contains an operator's seat which is rotatable through at least 180° about a vertical axis.

In a third aspect the invention provides a material handling machine having a chassis comprising a rigid longitudinal frame, a front axle and a rear axle mounted on the chassis, wheels mounted on the axles, a drive arrangement comprising an engine and a mechanically driven transmission kinematically connected to the engine, the drive arrangement having a power output, final drive units on the respective front and rear axles, for driving the wheels, and shafts kinematically connecting the power output to the final drive units, the drive arrangement being mounted at one side of the longitudinal frame, between the front and rear axles, the power output being substantially mid-way along the drive arrangement and being offset from the longitudinal center-line of the drive arrangement towards the longitudinal center-line of the machine.

The power output can be arranged to be directly below the longitudinal frame and substantially mid-way between the front and rear axles. Both of these features optimise the arrangement of the shafts connecting the power output to the final drive units.

In a fourth aspect the invention provides a material handling machine having a chassis comprising a rigid longitudinal frame, a front axle and a rear axle mounted on the chassis, wheels mounted on the axles, an engine mounted at one side of the frame between the front and rear axles, the longitudinal frame having a width which is less than 25% (preferably at most 22.5%, possibly as little as 20% or less) of the overall width of the machine excluding the wheels.

The narrow longitudinal frame maximises the lateral space available for the engine. It also minimises the distance between the center of gravity of the engine and the center-line of the machine.

The longitudinal frame preferably has a height which increases progressively from a front portion to a rear portion of the frame.

This enhances forward visibility and provides enhanced strength at the rear, e.g. for supporting a pivotal mounting for a boom and means for mounting digging equipment such as a backhoe. Preferably the height increases at a substantially constant rate from the front to an intermediate portion and at a higher rate from the intermediate portion to the rear of the frame.

The front axle and a rear axle may each be mounted on the chassis for oscillating motion about an axis parallel to the longitudinal center-line of the machine, first means being provided for controlling the oscillating motion of the front axle, second means for controlling the oscillating motion of the rear axle, and actuating means for selectively operating the said first and second means independently of each other.

Preferably, the actuating means has a first mode of operation in which the front axle is free to oscillate through a limited range and the rear axle is prevented from oscillating, for the purpose of working with the digging equipment, and a second mode of operation in which the oscillating motion of the front axle is continuously controlled to level the chassis and the rear axle is free to oscillate through a limited range, for the purpose of working with the material handling means. In the second mode, it is preferable for the actuating means to prevent the rear axle from oscillating when the material handling means reaches a given elevation.

BRIEF DESCRIPTION OF THE DRAWINGS

The invention will be described further, by way of example only, with reference to the accompanying drawings, which are diagrammatic and in which.

DESCRIPTION OF THE PREFERRED EMBODIMENTS

Figure 1:
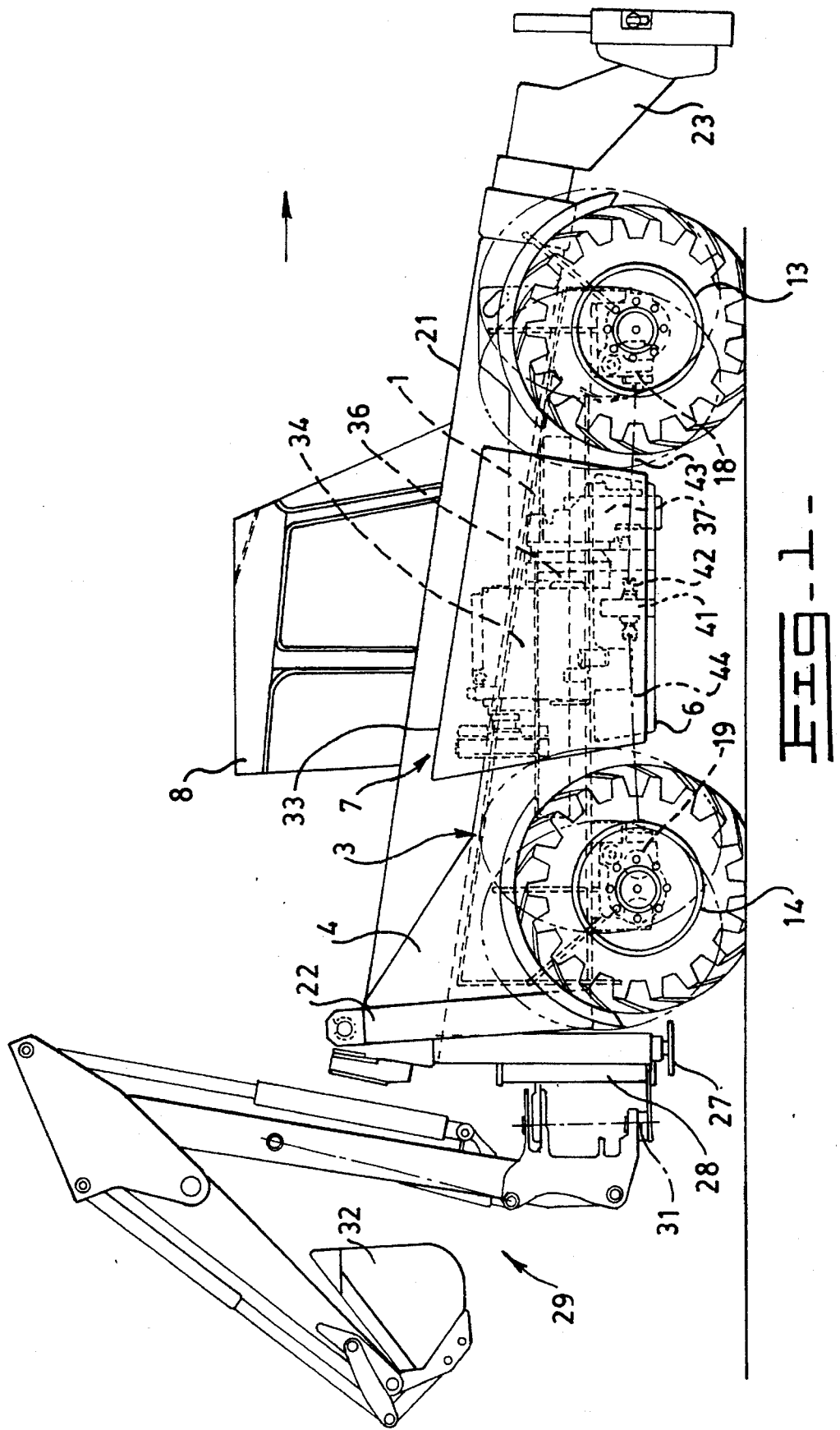
FIG. 1 is an elevation of a material handling machine, seen from the right-hand side, showing a cab in a first position.

The machine illustrated in FIGS. 1 to 8 can be used as a telescopic material handler (for pallet lifting), a loader (for loading), and a backhoe (for digging). It has a chassis comprising a rigid longitudinal frame 1 extending along the whole of the length of the body of the machine. The frame 1 is of substantially constant width and its center-line is in the same vertical plane 2 as the center-line of the machine. When viewed from the side, the frame 1 is wedge-shaped: its height increases, at a constant gradient, from the front to an intermediate point 3, from where the rear portion 4 of the frame rises more steeply. A rigid transverse frame 6, extending across the whole width of the machine body, is mounted underneath the longitudinal frame 1 and supports a drive (engine/transmission) arrangement 7 on one side and an operator's cab 8 on the other side. The width of the longitudinal frame 1 is 22.5% of the overall transverse width of the transverse frame 6.

Front and rear axles 11, 12 are mounted on the frame 1 for oscillating motion through a range limited to ±10° about an axis parallel to the center-line of the frame 1 and lying in the vertical plane 2. The axles 11, 12 carry front and rear wheels 13, 14 of equal size, steered by means of hydraulic piston-and-cylinder devices 16, 17. The extreme positions of the wheels 13, 14 are indicated in chain-dotted line in FIGS. 1 to 6. The front and rear wheels 13, 14 are drivable via final drive units 18, 19.

Figure 7:
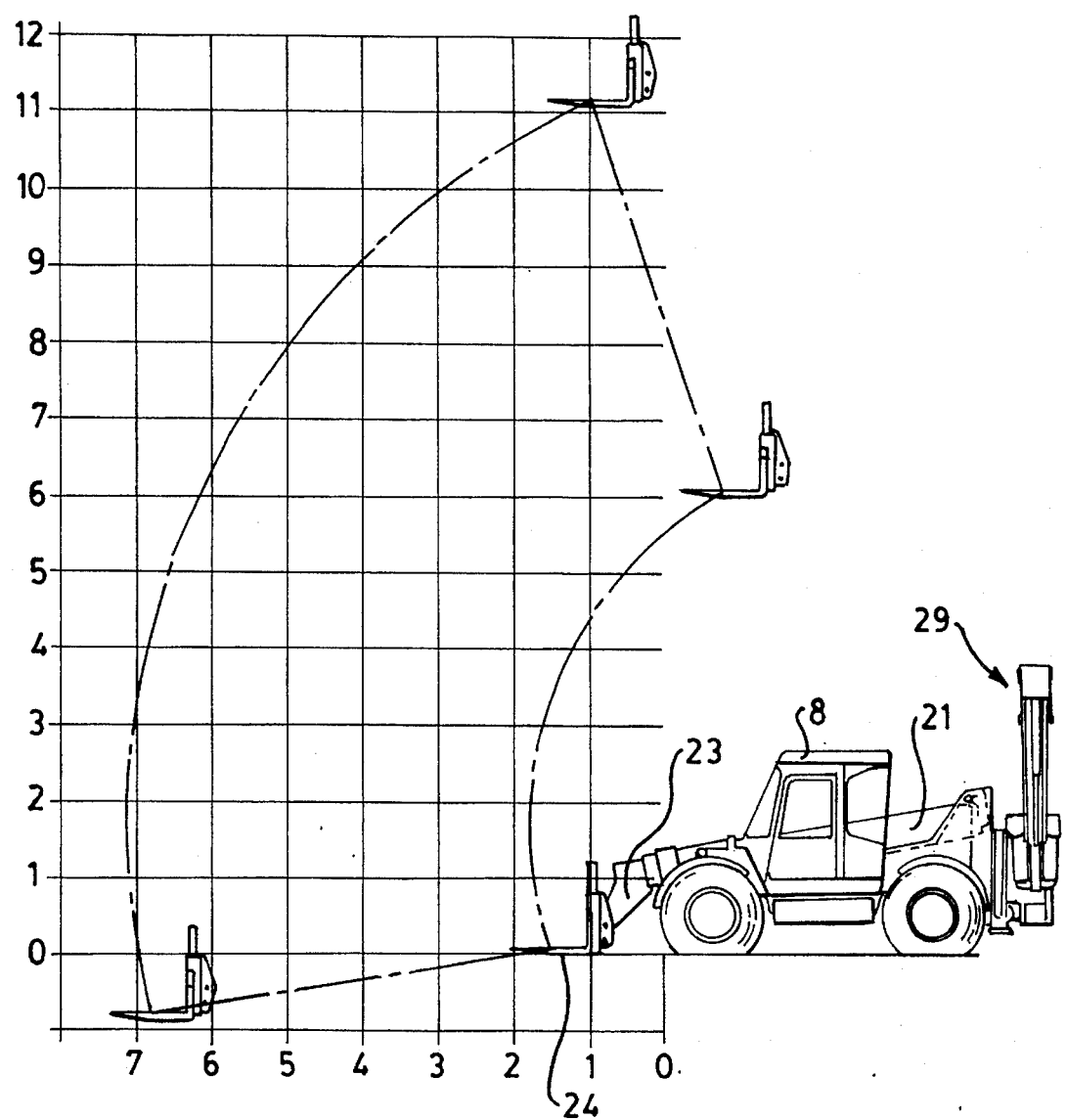
FIG. 7 is a graph showing the reach and height, both in meters, of the operating range of pallet lifting forks on a telescopic boom on the machine.

A telescopic boom 21, having three sections, is pivotally mounted on brackets 22 fixed to the rear portion 4 of the chassis frame 1. The extremity 23 of the boom 21 is fitted with pallet lifting forks 24 (FIG. 7) or a loader bucket 26 (FIG. 8) or some other handling device. FIG. 7 shows the operating range of the boom 21. It is to be noted that the telescopic boom 21 will normally be retracted before it is moved from a low elevation to a high elevation. The center-line of the boom 21 lies in the vertical plane 2 and it is pivotable by means of a hydraulic piston-and-cylinder device (not shown), connected between the chassis frame 1 and the first section of the boom. At its highest elevation the extremity 23 of the retracted boom is between the front and rear axles 11, 12.

Figure 8:
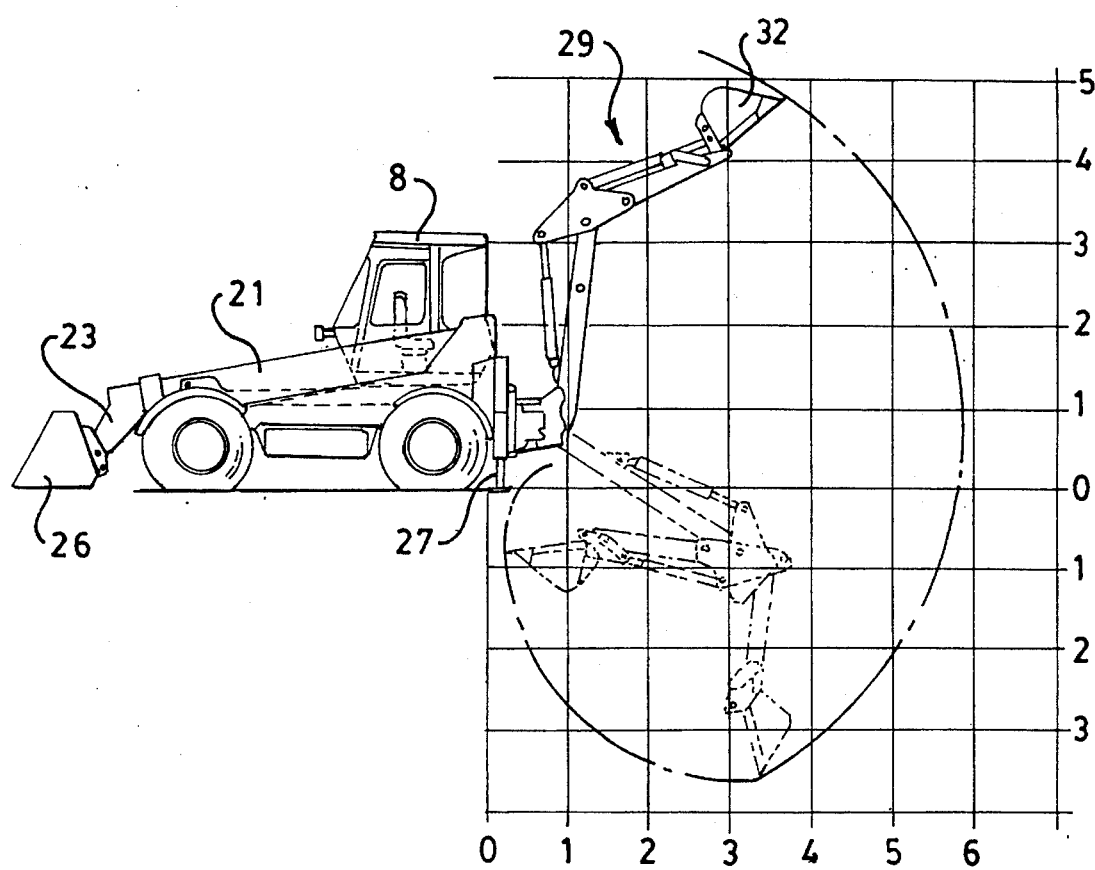
FIG. 8 is a graph showing the reach, height, and depth, all in meters, of the operating range of the shovel of a backhoe on the machine.
Figure 9:
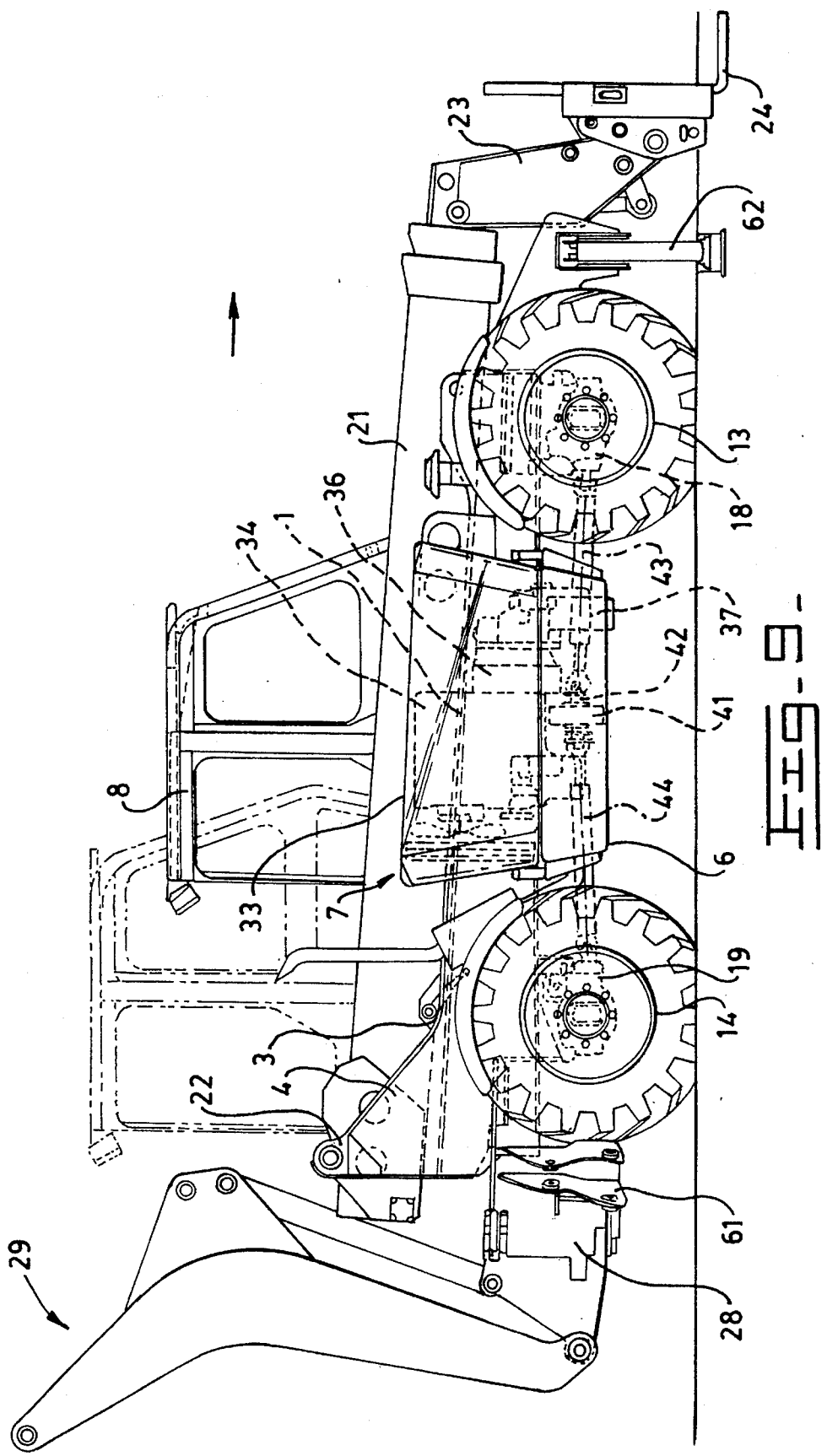
FIGS. 9 to 13 correspond respectively to FIGS. 1 to 3, 5 and 7 and show a modified embodiment of the machine.
Figure 10:
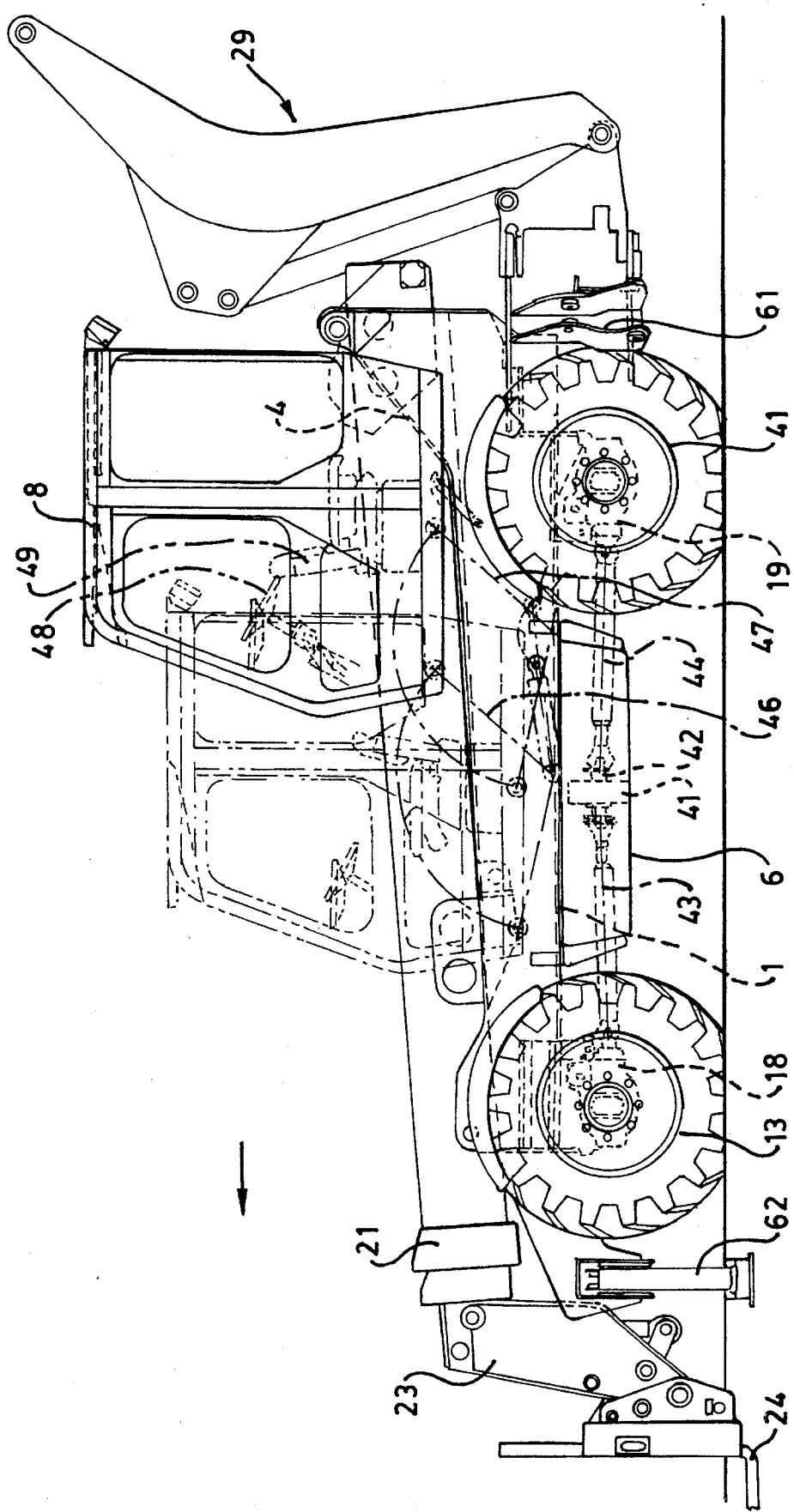
Figure 11:
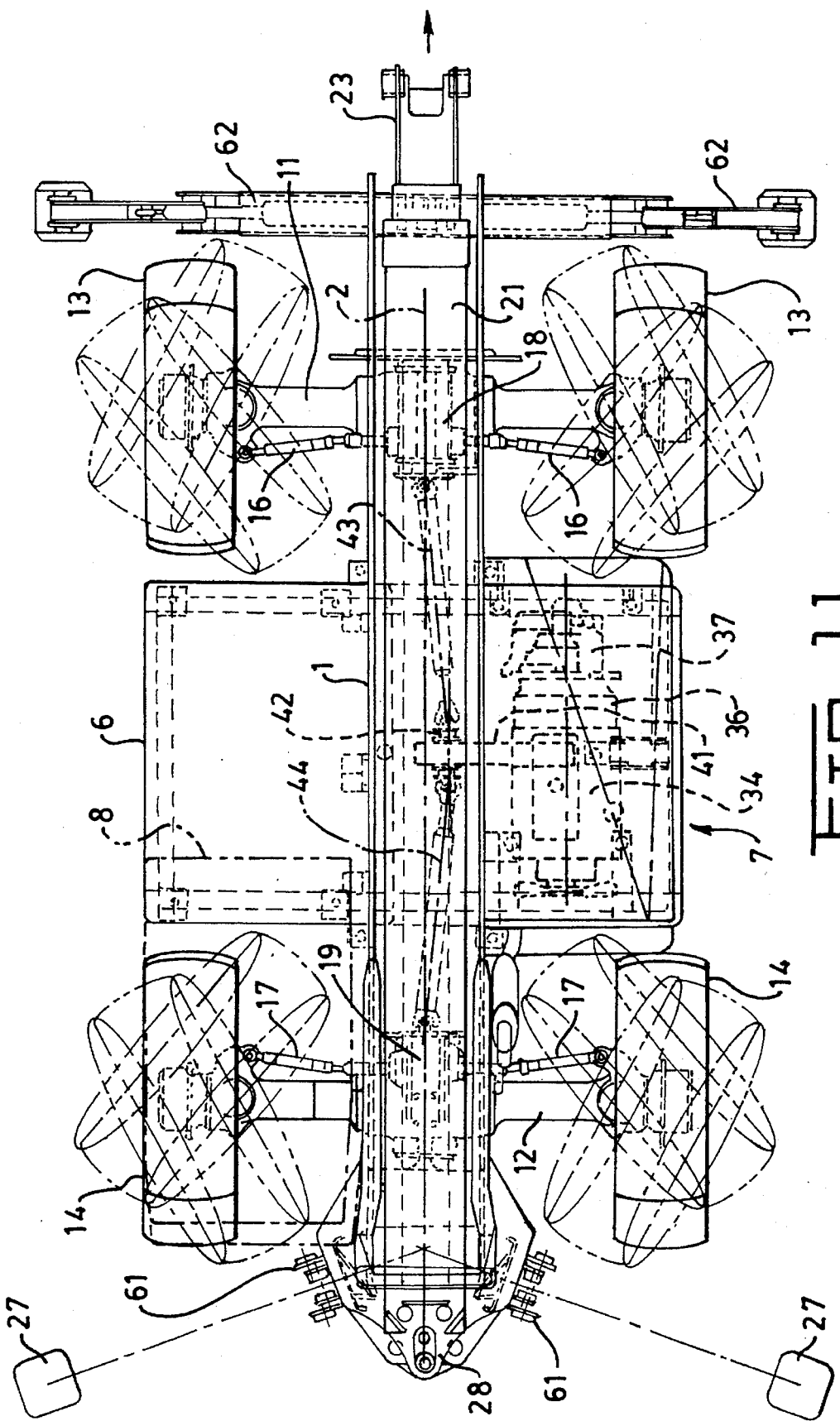
Figure 12:
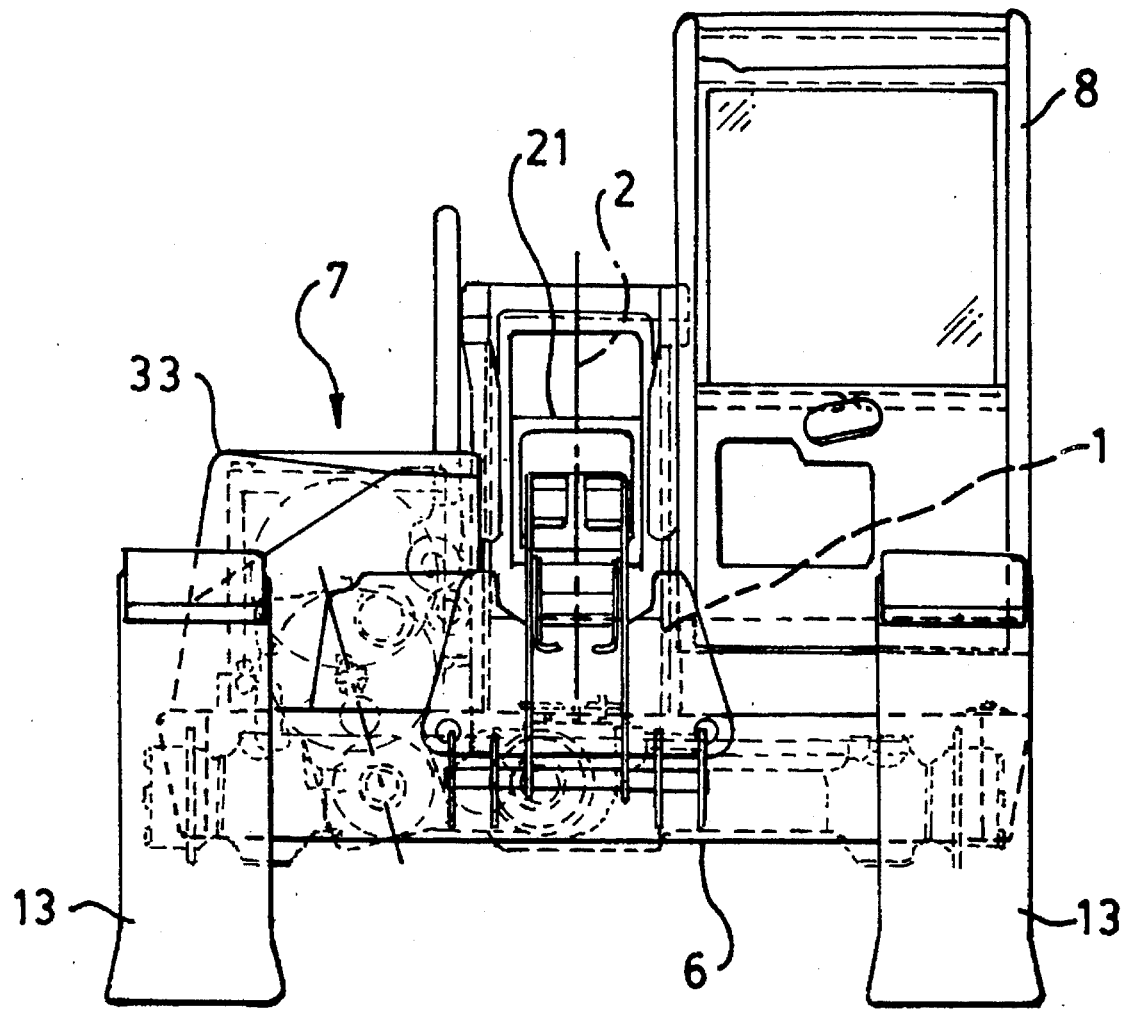

The rear of the chassis frame 1 carries a pair of telescopic stabilisers 27 and a frame 28 for mounting a conventional backhoe 29 which is pivotable about a vertical axis 31 between a working position (FIGS. 1, 2, and 8) and a stowed position (FIG. 7). The axis 31 is offset from the plane 2 in the opposite direction to the cab 8, to allow space for stowage of the backhoe 29 and to enhance visibility from the cab 8 when working with the backhoe 29. However, the backhoe could, if required, be mounted at another position across the frame 28. FIG. 8 shows the operating range of the shovel 32 of the backhoe 29, the stabilisers 27 being in engagement with the ground.

Selectable control of the oscillating motion of each of the front and rear axles 11, 12 is provided, in order to take account of the different requirements during operation with the boom 21 and operation with the backhoe 29. The axles are linked to the chassis frame 1 by hydraulic piston-and-cylinder devices (not shown) serving as means for controlling the oscillating motion of the respective axles. Automatic actuating means (not shown), comprising detectors and valves, are provided to operate the piston-and-cylinder devices selectively, depending on whether the boom or the backhoe is being used.

If the operator is working with the backhoe 29, this is detected by the actuating means, which automatically operate the piston-and-cylinder devices so that, on the one hand, the front axle 11 is free to oscillate throughout its range of ±10° and, on the other hand, the rear axle 12 is locked in a position in which the chassis is transversely level (the stabilisers 27 engaging the ground to assist in keeping the chassis level).

If the operator is working with the boom 21, this is detected by the actuating means, which automatically operates the piston-and-cylinder devices so that, on the one hand, the oscillating motion of the front axle 11 relative to the chassis is continuously controlled (in response to the output of a transverse inclinometer on the chassis) to level the chassis transversely and, on the other hand, the rear axle 12 is free to oscillate throughout its range of ±10°. However, when the boom 21 reaches a given elevation (as detected by an inclinometer mounted on the boom) at which a significant proportion of the load is applied to the rear axle 12, then the actuating means automatically locks the rear axle or controls its oscillation so as to tend to keep the chassis transversely horizontal.

Figure 5:
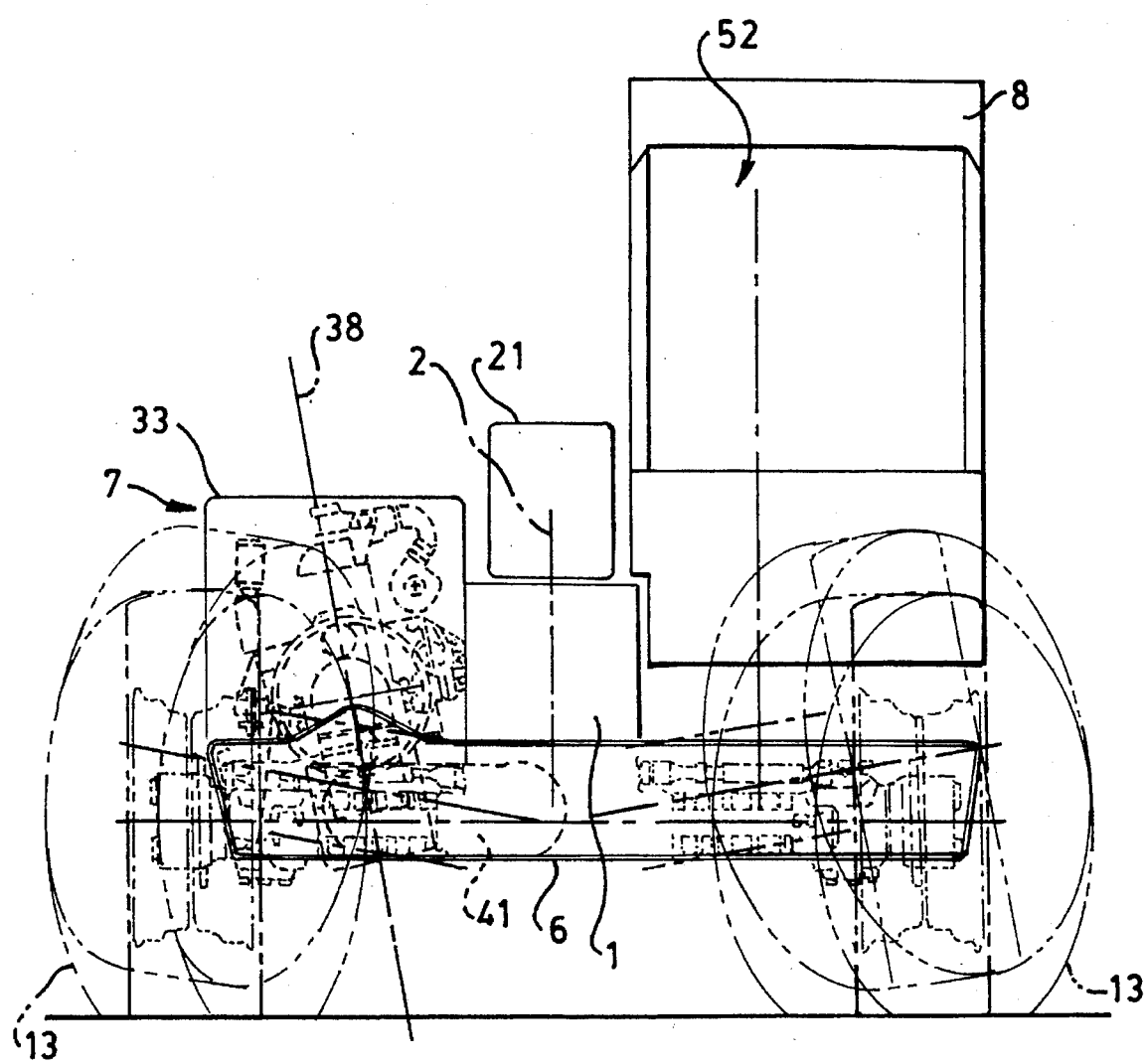
FIG. 5 is a schematic front view, with the cab in the first position.
Figure 6:
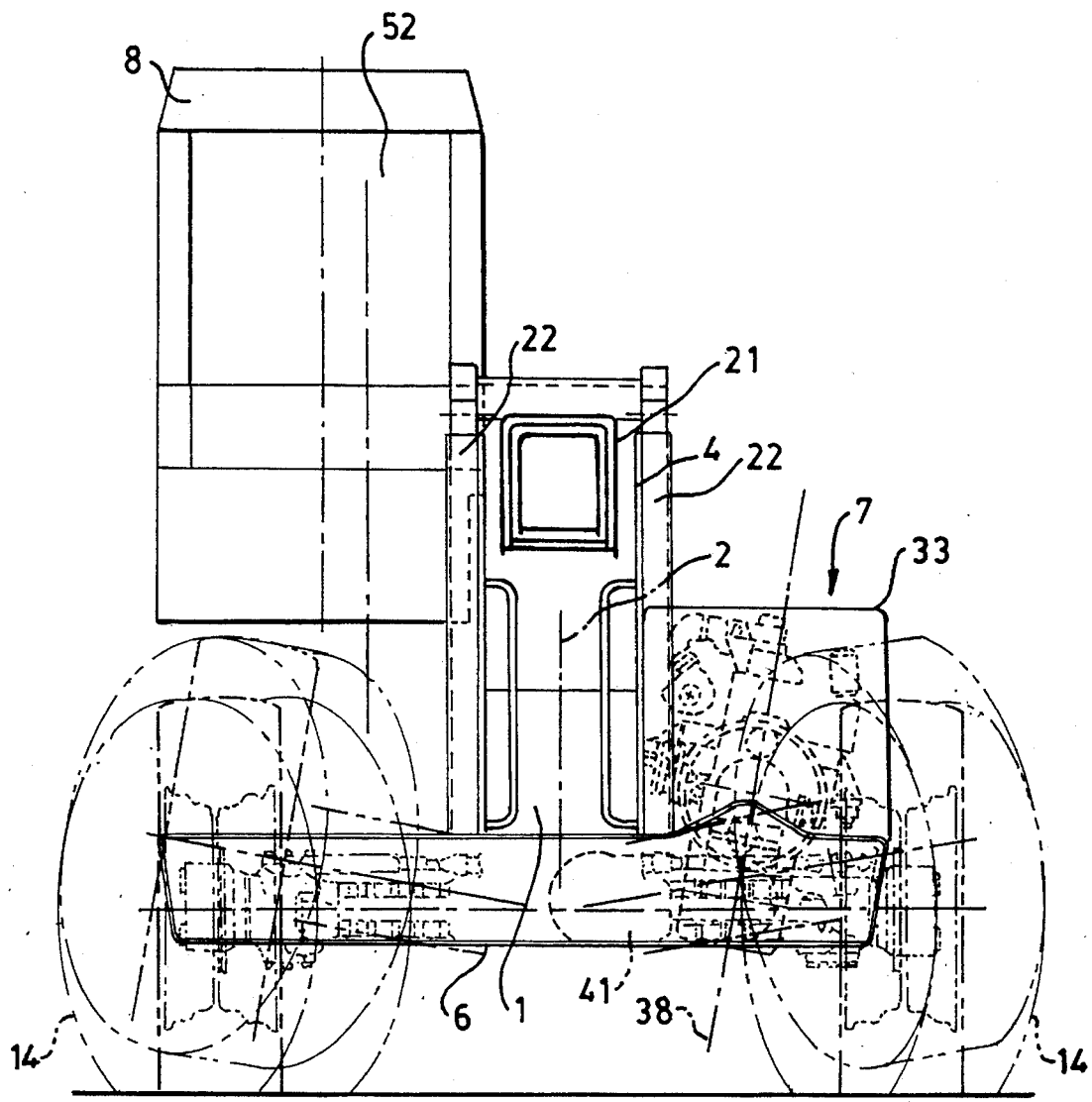
FIG. 6 is a schematic rear view, with the cab in the second position.

The side-mounted drive arrangement 7, which is covered by a hood 33 that does not obstruct the operator's view to the front and rear, comprises a longitudinally arranged diesel engine 34 connected by means of a torque converter 36 to a gearbox 37. The median plane 38 of the engine and gearbox is tilted (as shown in FIGS. 5 and 6) at an angle of 10° to the vertical, so as to bring the gearbox output closer to the central plane 2. The gearbox output is connected by means of a Cardan shaft (axis 39) to a transfer box 41 mid-way along the engine/transmission arrangement 7 and mid-way between the axles 11, 12. The power take-off or output (axis 42) of the transfer box 41 lies beneath the longitudinal frame 1 and close to the central plane 2. The power take-off is connected by means of respective Cardan shafts (axes 43, 44) to the final drive units 18, 19.

Figure 2:
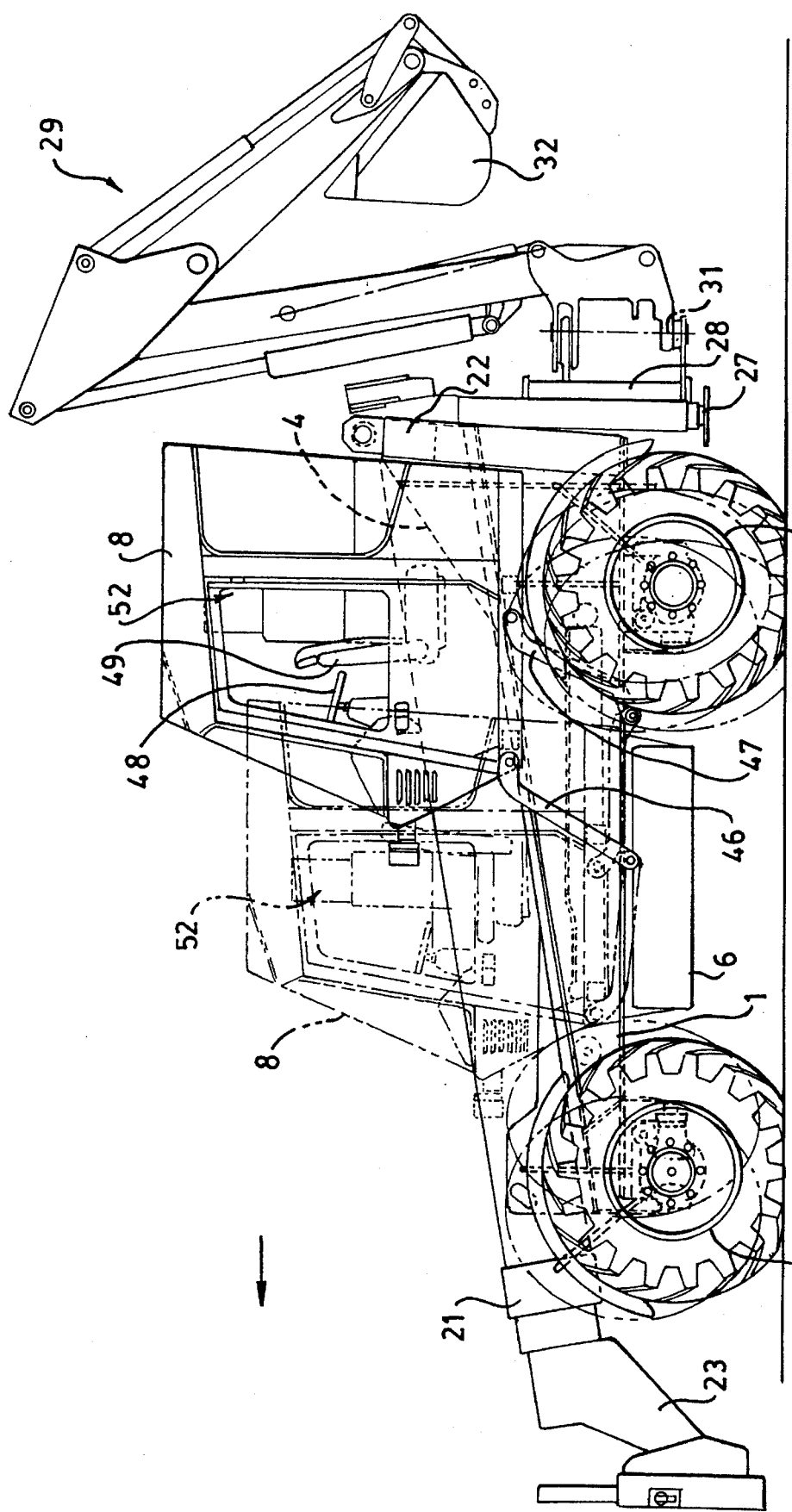
FIG. 2 is an elevation of the machine, seen from the left-hand side, showing the cab in a second position (full line) as well as the first position (in phantom)
Figure 3:
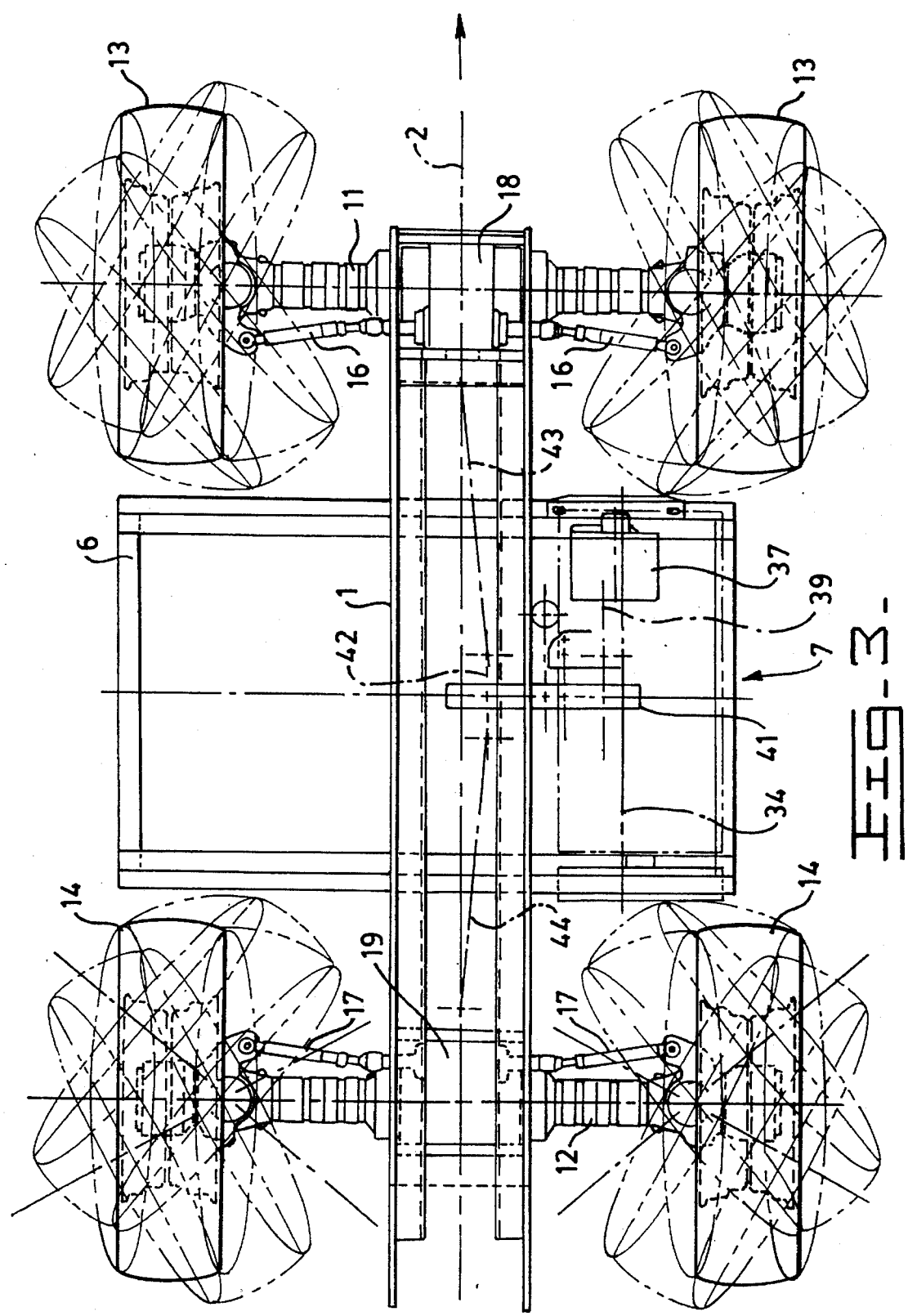
FIG. 3 is a schematic plan view showing the layout of the engine/transmission arrangement in relation to the chassis and front and rear axles of the machine.
Figure 4:
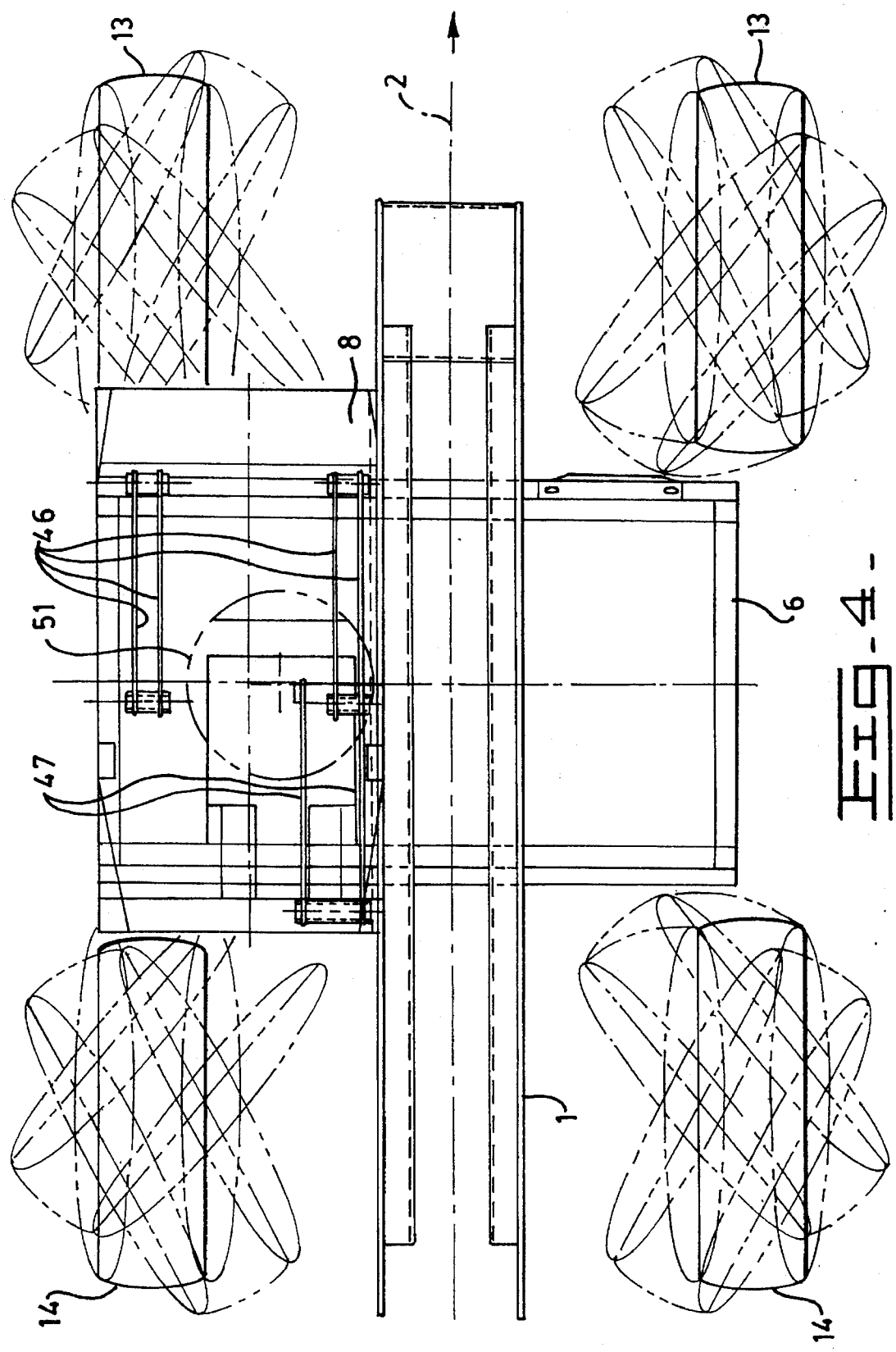
FIG. 4 is a schematic plan view showing the mounting of the cab in relation to the chassis.

The cab 8 is mounted on the chassis by means of a parallelogram mechanism, comprising two pairs of front arms 46 and a pair of rear arms 47, allowing the cab 8 to be moved (without rotation) from a first (lower, forward) position between the front and rear axles 11, 12 (see FIGS. 1, 4, and 5, full line, and FIG. 2, broken line) to a second (upper, rearward) position above the rear axle 12 (see FIGS. 2 and 6 full line). The cab 8 contains controls (including a steering wheel 48) at the front for operating with the boom 21 and controls (not shown) at the rear for operating with the backhoe 29. An operator's seat 49 is rotatable (turning circle 51 indicated in FIG. 4) to allow the operator to face forwards or backwards. The position of an operator's eye is indicated at 52 in each of FIGS. 2, 5, and 6, showing that the machine provides good visibility for all the operations it is designed to carry out.

Various modifications may be made within the scope of the invention. For example, when using a loader bucket (rather than pallet forks) a one or two-section boom will normally be sufficient. The boom may be pivotally mounted at a position between the front and rear of the longitudinal frame 1, in which case the cab may be mounted centrally of the width of the machine, above the rear part of the longitudinal frame 1. Digging equipment other than a backhoe may be mounted on the rear of the machine, or omitted. Three-mode selectable steering (four wheel, crab, or front wheel) may be provided.

A modified embodiment of the machine is shown in FIGS. 9 to 13. Similar part are given the same reference numerals. The rear of the chassis frame 1 has oblique brackets 61 for mounting the stabilisers 27; the backhoe pivot axis lies on the center-line of the frame 1. At the front the frame 1 carries a pair of telescopic stabilisers 62.

Figure 13:
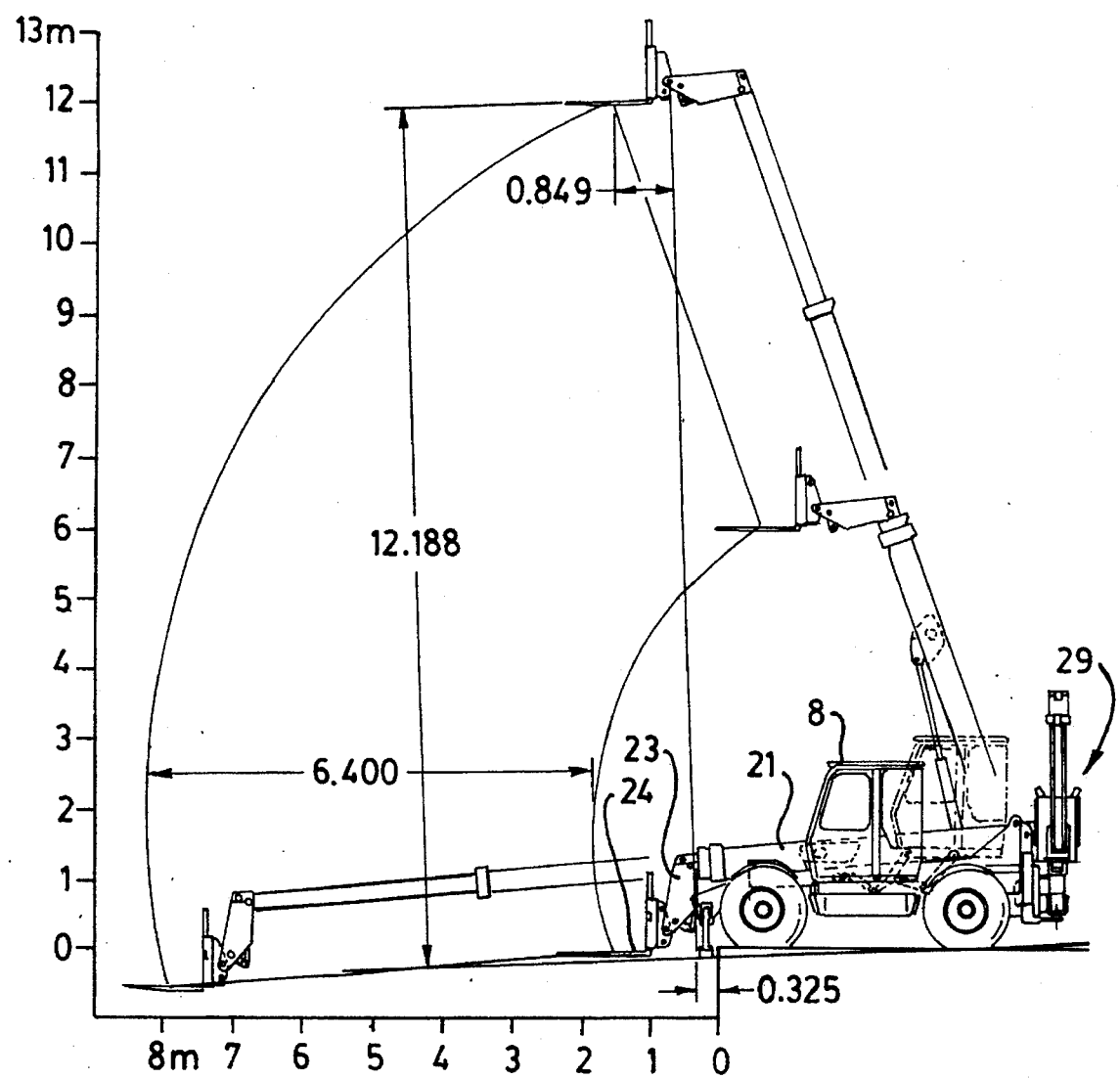
Figure 14:
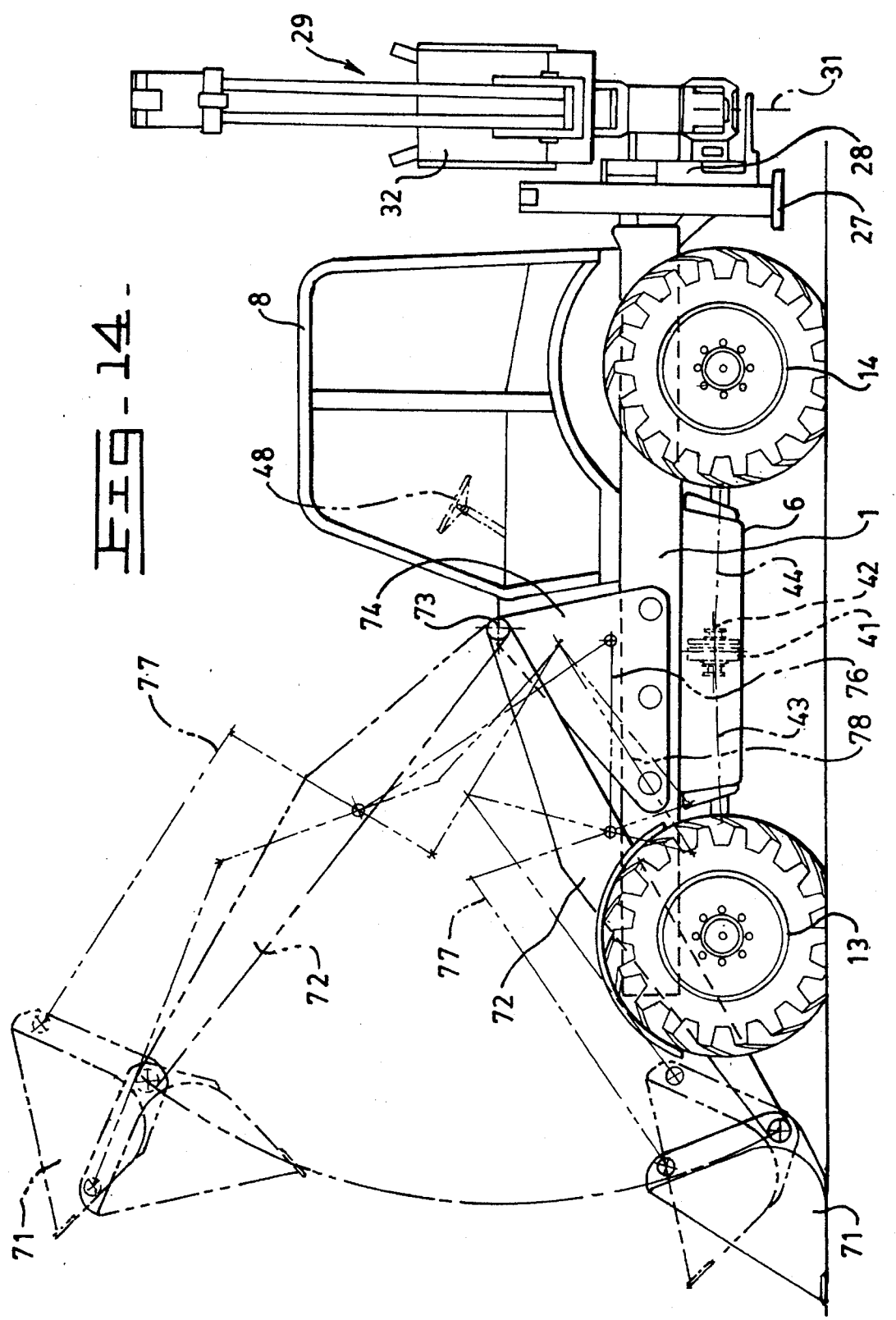
FIG. 14 is an elevation of another material handling machine, with a loader bucket and a backhoe.
Figure 15:
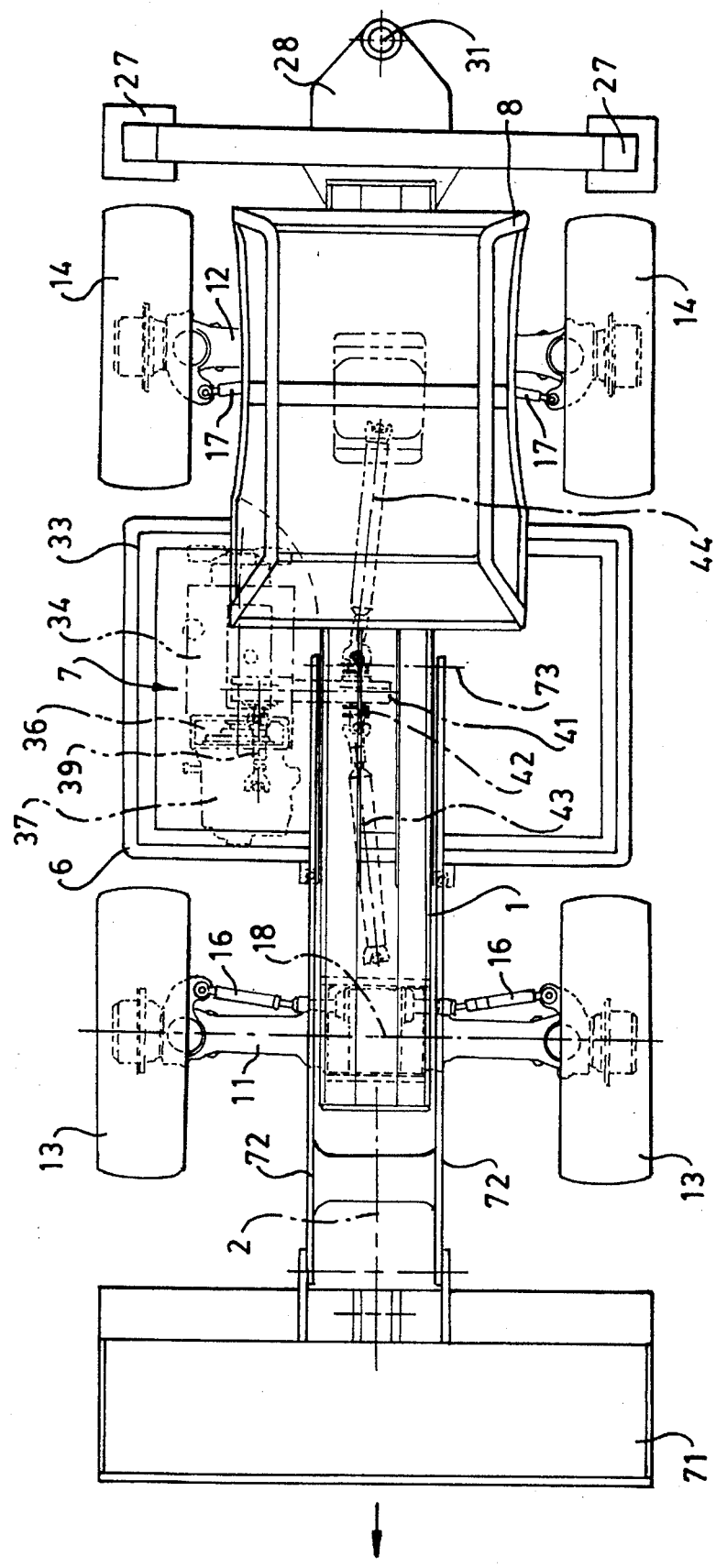
FIG. 15 is a schematic plan view of the machine of FIG. 14, omitting the backhoe.

The embodiment shown in FIGS. 13 and 14 differs from those described above in that the boom is replaced by a loading bucket 71 pivotally mounted on the front ends of a pair of arms 72 whose rear ends are mounted for pivoting about an axis 73 on side plates 74 fixed to the longitudinal chassis frame 1. In this embodiment the cab 8 is fixed on top of the frame 1, being centrally positioned with respect to the width of the machine, near the rear of the chassis. The loader arms 72 are raised and lowered by a hydraulic piston-and-cylinder device 76. The bucket 71 is connected by a linkage 77 to one end of a piston-and-cylinder device 78 whose other end is pivoted to one of the side plates 74, for controlling the bucket. Various positions of the arms 72, linkage 77, and bucket 71 are shown in FIG. 14. It will be appreciated that, in comparison with conventional loaders, this machine provides the advantages of improved forward and rearward visibility and an improved linkage arrangement.

I claim:

1. A material handling machine, comprising a chassis having a rigid longitudinal frame; an operator's cab mounted on said chassis; material handling means pivotally mounted on said chassis; a front axle and a rear axle mounted on said chassis; wheels mounted on said axles; a drive arrangement mounted on said chassis at one side of said longitudinal frame between said front and rear axles, said drive arrangement including an engine and a mechanically driven transmission kinematically connected to said engine and having a power output substantially mid-way along said drive arrangement; final drive units provided on said front and rear axles respectively for driving said wheels; and shafts kinematically connecting said power output of said transmission to said final drive units, said chassis having a rear portion and said cab being located substantially centrally with respect to a width of the machine and mounted adjacent said rear portion of said chassis.

* * * * *